UNITED STATES PATENT OFFICE.

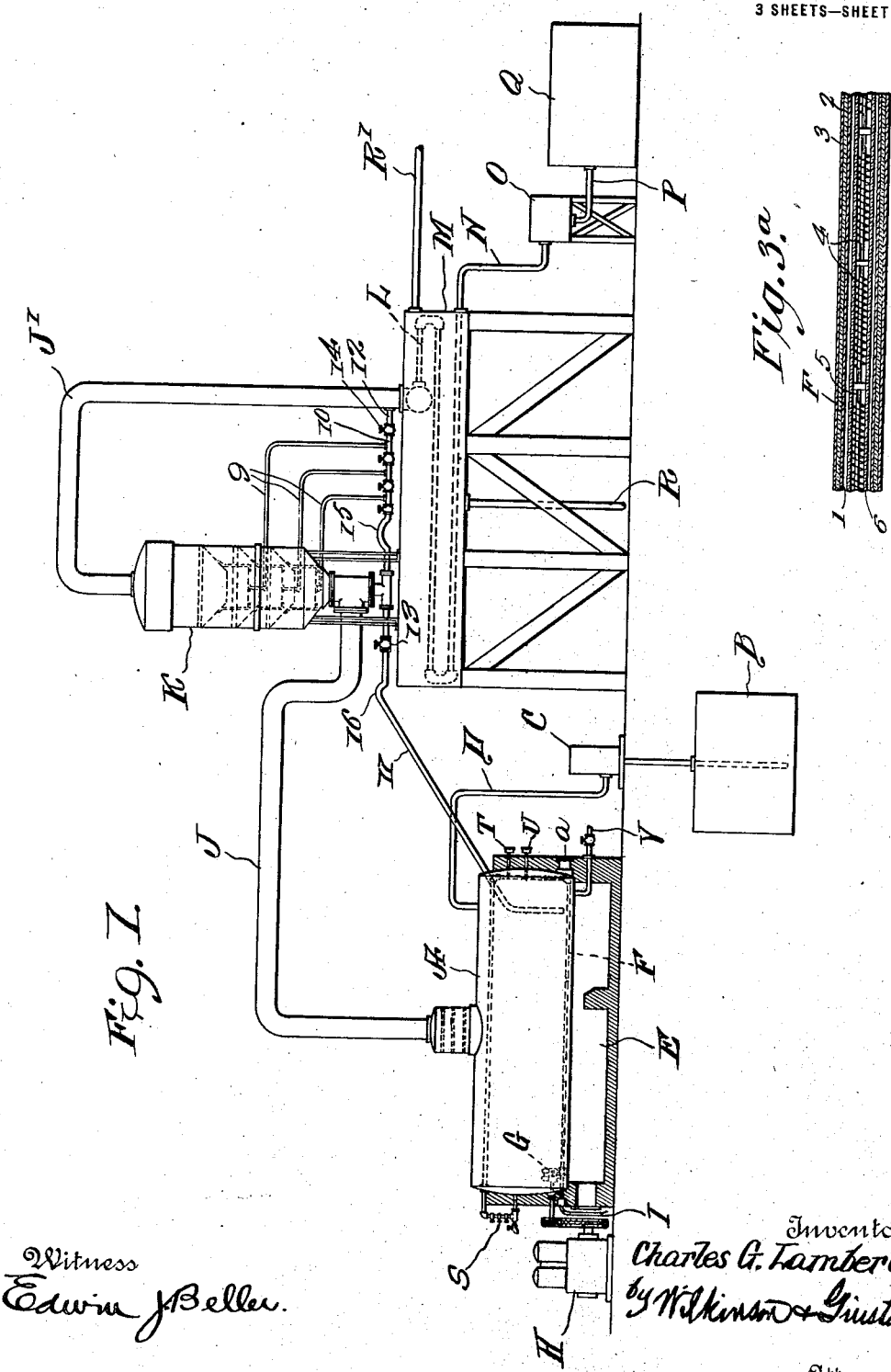

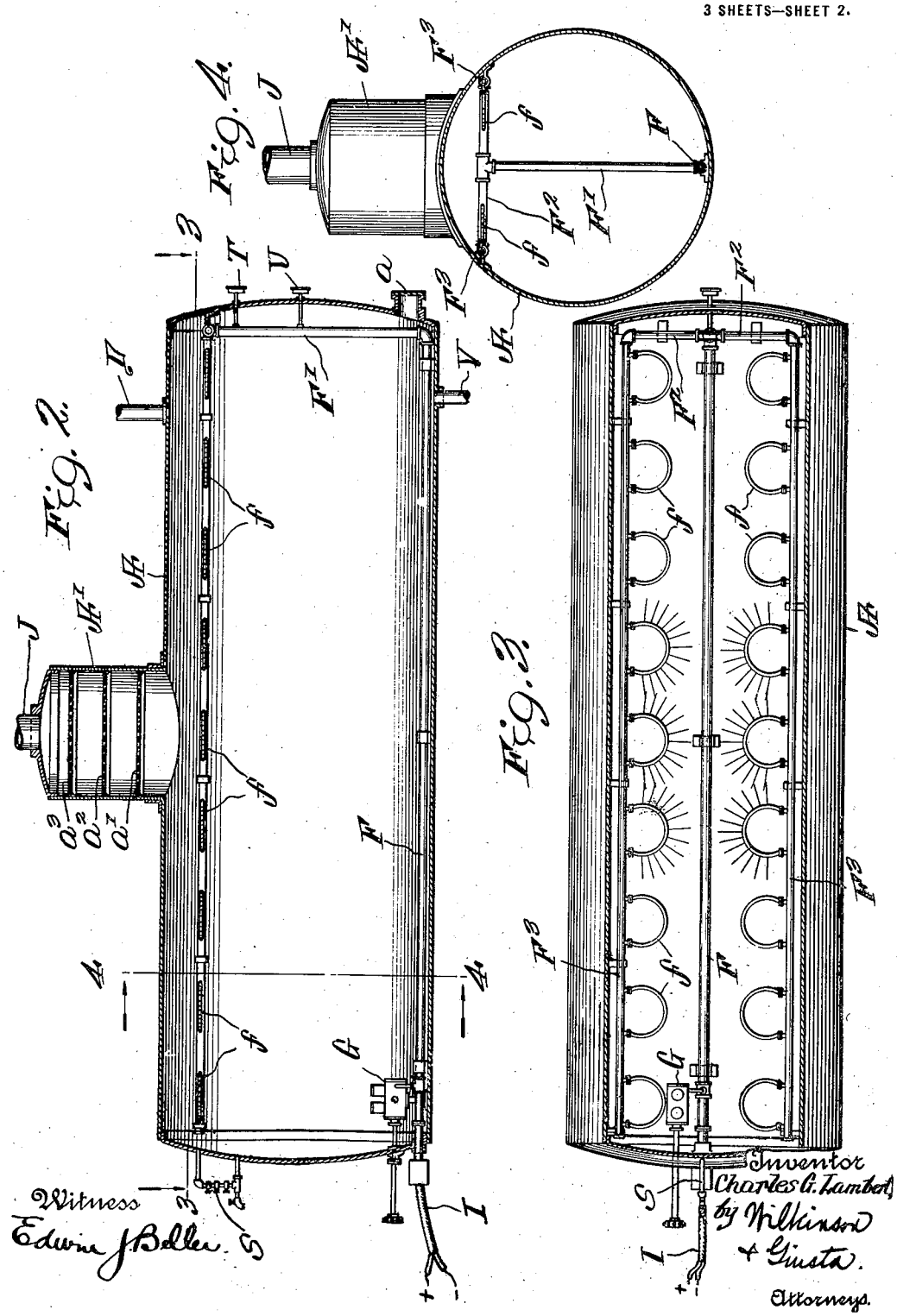

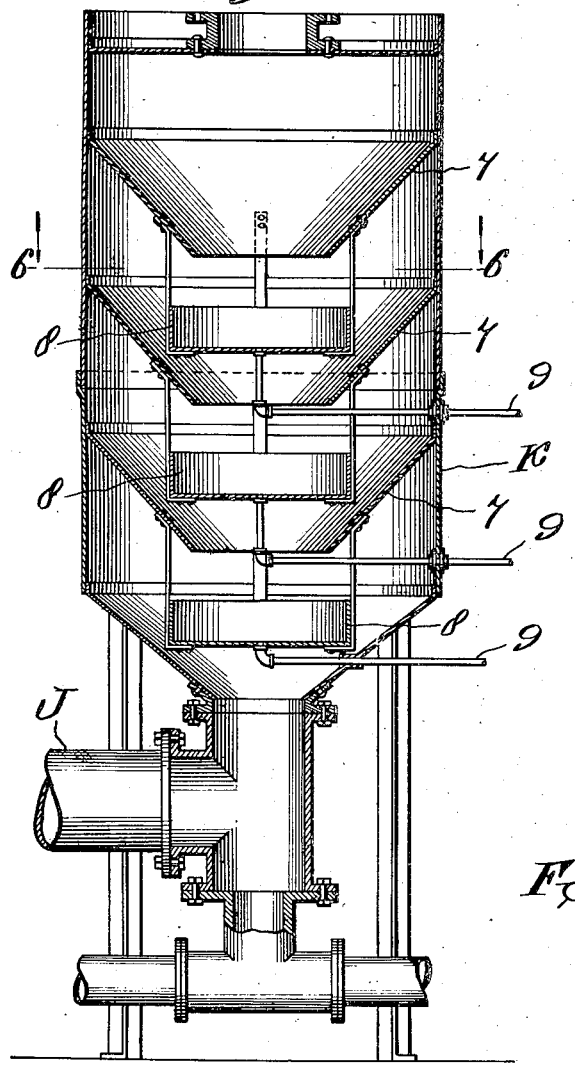
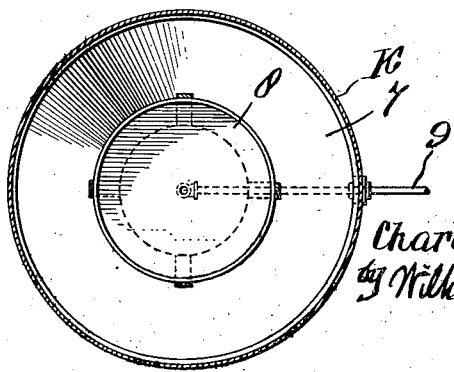

CHARLES GUY LAMBERT, OF SHREVEPORT, LOUISIANA.

APPARATUS FOR CRACKING OILS.

1,245,930.  Specification of Letters Patent.  Patented Nov. 6, 1917.

Application filed July 7, 1917. Serial No. 179,214.

*To all whom it may concern:*

Be it known that I, CHARLES GUY LAMBERT, a citizen of the United States, residing at Shreveport, in the parish of Caddo and State of Louisiana, have invented certain new and useful Improvements in Apparatus for Cracking Oils; and I do hereby declare the following to be a full, clear, and exact description of the invention, such as will enable others skilled in the art to which it appertains to make and use the same.

My invention relates to processes for cracking oil, and it relates especially to that method of cracking oil which consists in heating the oil to a high temperature and under high pressure and then allowing it to escape and expand; whereby the lighter particles are caused to separate from the heavier and rise, and are carried away to be separated and clarified and refined, as will be hereinafter more fully described.

My invention will be understood by reference to the accompanying drawings, which show an embodiment of the preferred form, and in which like parts are indicated by like reference symbols throughout the several views:

Figure 1 is a diagram showing a side elevation of the complete apparatus, the furnace being shown in section;

Fig 2 shows a central longitudinal section through the cylindrical still shown in Fig. 1;

Fig. 3 shows a horizontal section through the upper part of the still, the section being along the line 3—3 of Fig. 2, and looking down;

Fig. 3ª shows a horizontal section through the heating main, and shows the heaters in plan;

Fig. 4 shows a section along the line 4—4 of Fig. 2, and looking in the direction of the arrows;

Fig. 5 shows a section through the separator shown in Fig. 1, the parts being on a larger scale than in said figure;

Fig. 6 shows a section along the line 6—6 of Fig. 5, and looking down;

Fig. 7 shows a cross section through the heating main containing the electric heater, and through which the oil continuously passes to the sprays;

Figs. 8 and 9 show respectively, a central section, and an end view of a nozzle which may be substituted for the spraying device shown in Fig. 3; and Fig. 10 shows still another modified form of nozzle in which the spray issues through an elongated slit instead of through a circular opening.

Referring first to Figs. 1 to 4, A represents a cylindrical still into which the oil is pumped from the reservoir B by the pump C through the pipe D. This still is provided with a suitable manhole and cover $a$.

Beneath the still is provided a suitable furnace E. Mounted in the still is a heating main F into which the oil is pumped from the pump G driven in any convenient way, as by the engine H. This pump draws oil from the interior of the still and forces it into the main F. This main, shown in Fig. 7, is preferably composed of a strong pipe 1 surrounded by suitable heat insulating material 2, and is covered by a protective coating 3.

Mounted inside of this main is a series of electric heating coils 4 surrounding the core 5, and covered by non-conducting material 6 so that the electric current supplied to the heaters is insulated from the main.

Electric current is supplied by conductors I connected to any suitable source of low tension currents of electricity.

The heating main F is connected by the vertical pipe F' to the branch pipes $F^2$, which are connected, respectively, to the delivery pipes $F^3$, the oil escaping from these pipes in the form of a series of sprays.

These sprays may be secured by using U-shaped pipes $f$ provided with minute perforations therethrough as shown in Figs. 2 and 3; or, instead of these U-shaped pipes $f$, suitable nozzles $f'$, as shown in Figs. 8 and 9, or nozzles $f^2$, as shown in Fig. 10, may be provided.

On top of the still the dome A' is mounted, which is provided with a series of perforated baffle plates $a'$, $a^2$, $a^3$, the perforations in the plate $a'$ being preferably of larger diameter than those in the plate $a^2$, and the perforations in the plate $a^2$ being of preferably larger diameter than those in the plate $a^3$. The number of these baffle plates may be increased or decreased as desired.

This dome is connected by the vapor line J to the base of the separator K, which is provided with inverted truncated cones 7, beneath each of which are suspended drip pans 8 which catch the condensates of the gases, while the gaseous particles rise upward and are carried off by the pipe J' constituting the second part of the vapor line, which delivers the gas to any suitable condensing coils L in the condenser M, the condensed oil being drained off by the pipe N to the weighing box O, and thence passing through the pipe P to the receiving tank Q.

Each of the drip pans 8 is provided with a drain pipe 9 connected to the manifold 10, which delivers the liquid caught in the drip pan either to the still by the pipe 11 or to the condenser by the pipe 12; these two pipes 11 and 12 being controlled by suitable valves 13 and 14.

Gooseneck traps 15 and 16 are also preferably provided to prevent the gas from going directly through the pipe J to the manifold 10.

The condenser M is provided with a water supply pipe R and an overflow pipe R'.

The height of the oil in the still is determined by a series of pet cocks S; the temperature of the oil in the main is determined by any suitable pyrometer; and the pressure by any suitable pressure gage, as shown in Figs. 1 and 3.

The operation of the apparatus is as follows:

The oil being pumped into the still to the desired height, a fire is started in the furnace E until the required temperature is reached. The temperature of the oil in the body of the still is brought up to preferably somewhere in the neighborhood of 200° F. This will tend to separate the oil from the water, and the water may be drawn off through a suitable drain V.

The heating of the oil also saves electricity, since the oil is hot when it is forced into the main F.

The oil being heated to the desired temperature, the pump G is started and the electric current is applied. The oil is heated to the desired temperature as it passes through the main F, and I have found in practice that satisfactory results are obtained by heating the oil in the main to a temperature of about 900° F., but the temperature of the oil may be varied within wide limits without departing from the spirit of my invention. Different oils would require different temperatures for treatment.

After the oil is heated to the desired temperature in the main, it escapes through the perforations f or the nozzles already referred to. These perforations should be made so small compared to the power of the pump, that the pressure exerted by the pump in the main may be carried as high as several thousand pounds, preferably as high as 5000 pounds per square inch.

The oil escaping through these minute orifices, and under very high pressure and at a high temperature, into the vapor space where the pressure is only slightly higher than that of the atmosphere, will crack the lighter volatile products being given off, and the heavier liquid particles as vapor dropping down into the main body of oil in the still, and the lighter gases, with more or less liquid entrained, will rise upward through the baffle plates in the dome and enter the vapor line where the gases are separated from the liquid particles in the separator K, and the oil is finally condensed in the condenser M and carried to the receiving tank Q.

Access to the interior of the still may be had through the manhole a, the contents of the still being of course first drawn off. The sprays, whether in the form of loops or nozzles, or any other form, should preferably be so attached that they may readily be removed from time to time for the substitution of fresh parts, since the holes through the same will tend to wear and become too large, due to the friction of the liquid passing therethrough under the high pressure and at the high temperature.

By having the heating main F inside of the shell of the still, if the pipe 1 should crack or burst under the high pressure to which the oil therein is subjected, or if any of its joints should leak, the oil contained in said pipe would join that already in the still and no harm would be done; whereas if the heating main were outside of the still, any rupture of the pipe 1, or any leakage from its joints, would result in the escape of oil with consequent danger of fire.

I have shown the pump G as inclosed in the shell of the still, and submerged in the body of oil contained therein. This construction is preferred because such high pressure pumps are liable to break down; and if the pump were mounted outside of the still and broke down, there would ordinarily be an escape of oil with corresponding danger of fire, whereas if the pump be inclosed in the still and breaks down, the fall of pressure in the pressure gage would indicate that the pump was not working, and the charge of oil may be distilled by heating it up in the still by means of the fire in the furnace.

After the run has been completed the manhole a may be opened and the pump repaired or removed.

While I have shown two delivery pipes F³ provided with spray openings, one at each side of the still, obviously a single delivery pipe or more than two such pipes may be used if desired.

I do not mean to confine my invention to the cylindrical form of shell for the still A, as various other well known forms may be adopted, if desired.

While I have shown in the apparatus the preferred embodiment of the invention, it will be obvious that different styles of condenser and separator might be used, and that numerous other variations might be made in the apparatus and the operation of the same without departing from the spirit of my invention.

Having thus described my invention, what I claim and desire to secure by Letters Patent of the United States is:

1. Apparatus for cracking oil comprising a still, a heating main in the form of a heavy pipe mounted in said still and coated with heat insulating material, an electric heater mounted in said pipe and electrically insulated therefrom, means for forcing the oil contained in said still under heavy pressure through said heating main, means for spraying the oil delivered by said main into the vapor space in said still, and means for carrying off the gaseous products obtained from said sprays from the top of the still, substantially as described.

2. Apparatus for cracking oil comprising a still, a heating main in the form of a heavy pipe mounted in said still and coated with heat insulating material, an electric heater mounted in said pipe and electrically insulated therefrom, means for forcing the oil contained in said still under heavy pressure through said oil main, means for spraying the oil delivered by said oil main into the vapor space in said still, and means for carrying off the gaseous products obtained from said sprays from the top of the still, with means for separating the condensates from said gaseous products and returning the same to the still, and means for condensing the final gaseous products into the liquid form, substantially as described.

3. Apparatus for cracking oil comprising a still, a heating main in the form of a heavy pipe mounted in said still and coated with heat insulating material, an electric heater mounted in said pipe and electrically insulated therefrom, a pump also located inside the still, for forcing the oil contained in said still under heavy pressure through said main, means for spraying the oil delivered by said main into the vapor space in said still and means for carrying off the gaseous products obtained from said sprays from the top of the still, substantially as described.

4. Apparatus for cracking oil comprising a still, a heating main in the form of a heavy pipe mounted in said still and coated with heat insulating material, an electric heater mounted in said pipe and electrically insulated therefrom, a pump also located in said still for forcing the oil contained in said still under heavy pressure through said main, means for spraying the oil delivered by said main into the vapor space in said still, and means for carrying off the gaseous products obtained from said sprays from the top of the still, with means for separating the condensates from said gaseous products and returning the same to the still, and means for condensing the final gaseous products into the liquid form, substantially as described.

5. Apparatus for cracking oil comprising a still chamber, a heating main in the form of a heavy pipe mounted in said still chamber and coated with heat insulating material, a series of electric heaters mounted in said pipe and electrically insulated therefrom, means for forcing the oil contained in said still under heavy pressure through said main, branch pipes located in the upper part of the still chamber and connected to said main, a series of spraying devices detachably connected to said branch pipes for spraying the oil delivered by said oil main into the vapor space in the upper part of said still chamber, and means for carrying off the gaseous products obtained from said sprays from the top of the still, substantially as described.

6. Apparatus for cracking oil comprising a still chamber, a heating main in the form of a heavy pipe mounted in said still chamber and coated with heat insulating material, a series of electric heaters mounted in said pipe and electrically insulated therefrom, means for forcing the oil contained in said still under heavy pressure through said main, branch pipes located in the upper part of the still chamber and connected to said main, a series of spraying devices detachably connected to said branch pipes for spraying the oil delivered by said oil main into the vapor space in the upper part of said still chamber, and means for carrying off the gaseous products obtained from said sprays from the top of the still, with means for separating the condensates from said gaseous products and returning the same to the still, and means for condensing the final gaseous products into the liquid form, substantially as described.

7. Apparatus for cracking oil comprising a still chamber, a heating main in the form of a heavy pipe mounted in said still chamber and coated with heat insulating material, a series of electric heaters mounted in said pipe and electrically insulated therefrom, a pump also contained in said still chamber for forcing the oil contained in said still under heavy pressure through said main, branch pipes located in the upper part of the still chamber and connected to said main, a series of spraying devices detachably connected to said branch pipes for spraying the oil delivered by said oil main into the vapor space in the upper part of said still chamber, and means for carrying off the gaseous products obtained from said sprays from the top of the still, substantially as described.

8. Apparatus for cracking oil comprising a still chamber, a heating main in the form of a heavy pipe mounted in said still chamber and coated with heat insulating material, a series of electric heaters mounted in said pipe and electrically insulated therefrom, a pump also contained in said still chamber for forcing the oil contained in said still under heavy pressure through said main, branch pipes located in the upper part of the still chamber and connected to said main, a series of spraying devices detachably connected to said branch pipes for spraying the oil delivered by said oil main into the vapor space in the upper part of said still chamber, and means for carrying off the gaseous products obtained from said sprays from the top of the still, with means for separating the condensates from said gaseous products and returning the same to the still, and means for condensing the final gaseous products into the liquid form, substantially as described.

In testimony whereof, I affix my signature.

CHARLES GUY LAMBERT.